United States Patent Office 3,153,663
Patented Oct. 20, 1964

3,153,663
PHOSPHORIC (PHOSPHONIC, PHOSPHINIC) OR THIOPHOSPHORIC (-PHOSPHONIC, -PHOSPHINIC) ACID ESTERS AND PROCESSES FOR THEIR PRODUCTION
Wilhelm Sirrenberg, Sprockhovel, Westphalia, Walter Lorenz, Wuppertal-Vohwinkel, Hanshelmut Schlor, Wuppertal-Barmen, Reimer Colln, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany
No Drawing. Filed May 29, 1962, Ser. No. 198,429
Claims priority, application Germany June 6, 1961
6 Claims. (Cl. 260—461)

The present invention relates to and has as its objects new and useful insecticidal compounds in the phosphorus field and processes for the preparation thereof. The new inventive compounds may be represented by the following general formula

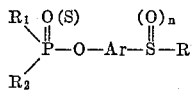

in which $R_1$ and $R_2$ stand for optionally substituted saturated or unsaturated aliphatic, cycloaliphatic, araliphatic or aromatic radicals which can be linked to the phosphorus atom directly or by oxygen, or for optionally N-substituted amino groups, whilst Ar means an optionally substituted arylene radical, and R stands for an optionally substituted aryl radical, and Ar and R may also form together with the sulfur atom a heterocyclic ring system, which may be interrupted by further hetero atoms or for an optionally substituted aralkyl radical especially the benzyl radical, and $n$ stands for 0, 1 or 2.

In accordance with this invention the production of these (thio)-phosphoric, (-phosphonic, -phosphinic) acid esters may be carried out by reaction of optionally substituted hydroxydiaryl sulfides or -sulfoxides or sulfones with (thio)-phosphoric, -phosphonic or -phosphinic acid halides of the general formula

in which the symbols have the same significance as given above and Hal means a halogen atom or partially by optionally oxidizing the resulting (thio)-phosphoric, (-phosphonic, -phosphinic) acid-O-(aryl-mercaptoaryl) esters to give the corresponding sulfoxide- or sulfone-containing compounds.

All these products which have a rather low toxicity towards warm-blooded animals, possess excellent insecticidal properties on account of which they represent valuable pest control or plant protecting agents.

In the first formula mentioned above the arylene radical Ar as well as the aryl and aralkyl radical R can be substituted, for example, by halogen atoms and/or alkyl-, alkoxy-, alkylmercapto-, hydroxy-, carbalkoxy-, nitro- cyano- and similar groups.

A special group of compounds with two phosphorus atoms in the molecule have the general formula

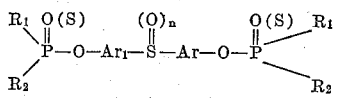

in which all the symbols have the above said significance, except for Ar and $Ar_1$, they there stand for identical or different, optionally substituted arylene, preferably phenylene, radicals, and they may also form, together with the sulfur atom, a heterocyclic ring system which may be interrupted by further hetero atoms such as O, S or N.

As substituents of the two arylene radicals there may be mentioned the same as said above for Ar, i.e., for example halogen atoms as well as alkyl, alkoxy, nitro or cyano groups.

The reaction according to the present process is preferably carried out at slightly to moderately elevated temperature in an inert organic solvent and in the presence of acid-acceptors. For this purpose alkali metal alcoholates and -carbonates may especially be considered. However, instead of using acid-binding agents, it is also possible to prepare first the salts, preferably the alkali metal or ammonium salts, of the above mentioned hydroxyaryl aralkyl sulfides (-sulfoxides, -sulfones) and then allow them to react with the aforesaid (thio)-phosphoric (-phosphonic, -phosphinic) acid halides.

If the process according to the present invention is carried out (preferably) in an inert organic medium, then such solvents as acetone, methyl ethyl ketone, methyl-isopropyl ketone or acetonitrile are used.

Sometimes, it is advantageous, in order to accelerate the reaction, to add small quantities of copper powder to the reaction mixture and, moreover, to allow the reaction to proceed at a slightly to moderately elevated temperature.

The compounds according to the invention of the general formula in which $n$ stands for 1 or 2 can, besides in the way indicated, also be produced by reacting optionally substituted hydroxyaryl aralkyl sulfides with the above mentioned phosphoric (phosphonic, phosphinic) or thiophosphoric (-phosphonic, -phosphinic) acid halides and subsequently oxidizing the resultant (thio)-phosphoric (-phosphonic, -phosphinic) acid-O-(aralkyl mercapto aryl) esters to the corresponding sulfoxide- or sulfone-containing compounds. As suitable oxidizing agents there may be employed particularly hydrogen peroxide, potassium permanganate, nitric acid or hypohalogenous acids.

As already mentioned above, the compounds obtainable by the method according to the invention are distinguished by an excellent insecticidal activity especially when used against eating insects, for example, caterpillars. For this reason it is intended to employ the products of the process as pest control agents, especially in plant protection.

The new compounds of the present invention very effectively kill insects like flies, mites, aphids, etc. They distinguish themselves especially by a good contact-insecticidal activity. They may be used in the same manner as other known phosphoric acid insecticides, i.e., in a concentration from about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

As examples for the special utility of the inventive compounds the esters of the following formulae

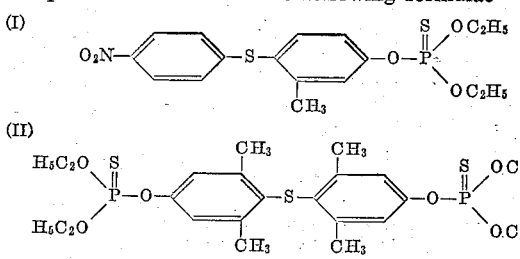

(III)
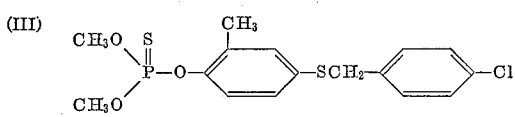

have been tested against flies.

Aqueous solutions of the aforementioned compound have been prepared by admixing them with the same amount of an auxiliary solvent (acetone). A commercial emulsifier (benzyl hydroxy diphenyl polyglycol ether) is added in an amount of 20% referred to active ingredient. This premixture then is diluted with water to the desired concentration. The test has been carried out as follows: About 50 flies (*Musca domestica*) are placed under covered petri dishes in which drip wet filter papers have been placed which were sprayed drip wet with an insecticidal solution of a concentration as shown below. The living status of the flies has been determined after 24 hours, and complete killing has been obtained with 0.01% solutions.

The following examples are given for the purpose of illustrating the present invention without, however, limiting the present invention thereto.

*Example 1*

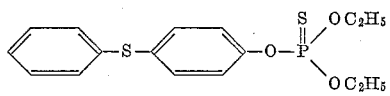

85 grams of 4-hydroxy-diphenyl sulfide are dissolved in 300 cc. of methyl ethyl ketone. 63 grams of anhydrous potassium carbonate are first added to this solution, thereafter 1 gram of copper powder, the mixture is warmed at 70° C. for half an hour, and 79 grams of O,O-diethylthionophosphoric acid chlordie are then added dropwise to the reaction mixture. To complete the reaction, the latter is thereafter still heated under reflux for 2 hours, and then cooled to room temperature. The precipitated salts are filtered off with suction, and the filtrate is poured into water. The separated oil is taken up in benzene, and the benzene solution is dried over sodium sulfate. After distilling off the solvent, there is obtained an oil which can be distilled with slight decomposition. B.P. 145° C./0.01 mm. of Hg. The yield amounts to 87 grams (corresponding to 59% of the theoretical).

*Analysis.*—Calculated for $C_{16}H_{19}O_3PS_2$: P, 8.74%; S, 18.09%. Found: P, 8.73%; S, 17.90%.

Spider mites are killed completely with 0.01% solutions and caterpillars are killed to 100% with 0.1% solutions.

*Example 2*

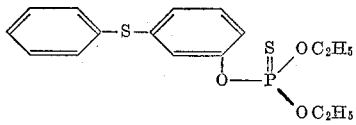

A mixture of 53 grams of anhydrous potassium carbonate and 1 gram of copper powder is added to a solution of 71 grams of 3-hydroxy-diphenyl sulfide in 300 cc. of methyl ethyl ketone, the mixture is warmed to 70° C. for half an hour, then treated dropwise with 67 grams of O,O-diethylthionophosphoric acid chloride, and, therefore, heated under reflux for another 2 hours. The reaction mixture is subsequently cooled down to room temperature and the separated precipitate filtered off with suction. The filtrate is poured into water, and the separated substance taken up in benzene. The benzene solution is dried over sodium sulfate and thereafter fractionally distilled. After distilling off the solvent, the residue is fractionated in a high vacuum. B.P. 145° C./0.01 mm. Hg. The yield amounts to 86 grams (corresponding to 69% of the theoretical).

*Analysis.*—Calculated for $C_{16}H_{19}O_3PS_2$: P, 8.74%; S, 18.09%. Found: P, 8.49%; S, 17.79%.

Spider mites are killed completely with 0.01% solutions.

*Example 3*

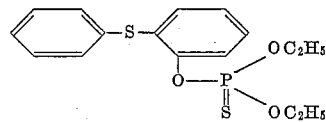

132 grams of 2-hydroxy-diphenyl-sulfide are dissolved in 500 cc. of methyl ethyl ketone, the solution is treated with a mixture of 82 grams of anhydrous potassium carbonate and 1 gram of copper powder, and thereafter heated to 70° for half an hour. 119 grams of O,O-diethylthionophosphoric acid chloride are subsequently added dropwise to the reaction mixture. After heating the mixture under reflux for 2 hours, it is worked up as described in the Examples 1 and 2. The product boils at 124° C. under a pressure of 0.001 mm. Hg. Yield 180 grams (corresponding to 77% of the theoretical).

*Analysis.*—Calculated for $C_{16}H_{17}O_3PS_2$: P, 8.74%; S, 18.09%. Found: P, 8.71%; S, 18.06%.

Spider mites are killed completely with 0.01% solutions.

*Example 4*

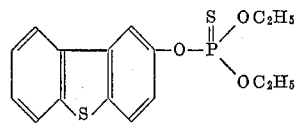

40 grams of 3-hydroxy-diphenylene sulfide are dissolved in 200 cc. of methyl ethyl ketone. 40 grams of anhydrous potassium carbonate and ½ gram of copper powder are added to the resultant solution, which is warmed to 70° C. for half an hour, and thereafter treated dropwise with 47.5 grams of O,O-diethylthionophosphoric acid chloride. In order to complete the reaction, the reaction mixture is thereafter heated under reflux for another 2 hours. The precipitated salts are then filtered off with suction, and the filtrate is poured into water. The separated oil is taken up in benzene, the benzene solution dried over sodium sulfate, and thereafter clarified with animal charcoal and kieselguhr. The solvent is finally evaporated and the residue distilled at 100° C. under a pressure of 1 mm. Hg. The yield amounts to 44 grams (corresponding to 62.5% of the theoretical).

*Analysis.*—Calculated for $C_{16}H_{17}O_3PS_2$: P, 8.79%; S, 18.20%. Found: P, 9.20%; S, 18.70%.

*Example 5*

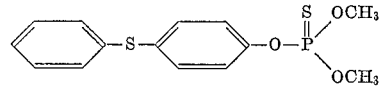

A solution of 30 grams of 4-hydroxy-diphenyl sulfide in 400 cc. of methyl ethyl ketone is treated with a mixture of 15 grams of anhydrous potassium carbonate and 1 gram of copper powder, and thereafter heated under reflux for half an hour. 34 grams of 72% of O,O-dimethylthionophosphoric acid chloride are then added dropwise to the reaction mixture which is heated under reflux for 2 hours, then cooled to room temperature, the solution is filtered, and the filtrate poured into water. Further working up of the reaction mixture is carried out as described in Example 4. 40 grams of a yellow oil (corresponding to 86.5% of the theoretical yield) are obtained.

*Analysis.*—Calculated for $C_{14}H_{15}O_3PS_2$: P, 9.49%; S, 19.65%. Found: P, 9.84%; S, 19.19%.

Caterpillars are killed to 90% with 0.001% solutions and spider mites are killed completely with 0.01% solutions.

*Example 6*

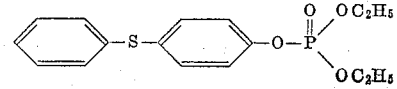

A mixture of 15 grams of anhydrous potassium carbonate and 1 gram of copper powder is added to a solution of 30 grams of 4-hydroxy-diphenyl sulfide in 400 cc. of methyl ethyl ketone, the mixture boiled under reflux for half an hour and 28 grams of O,O-diethylphosphoric acid chloride are then added dropwise to the reaction mixture, which is thereafter heated under a reflux condenser for another 2 hours and then cooled down to room temperature; the separated salts are filtered off, the filtrate poured into water, and worked up as described in Example 4, and there are obtained 45 grams of a light yellow oil (corresponding to 90% of the theoretical).

*Analysis.*—Calculated for $C_{16}H_{19}O_4PS$: P, 9.16%; S, 9.48%. Found: P, 9.74%; S, 9.15%.

Aphids and spider mites are killed completely with 0.1% solutions.

Example 7

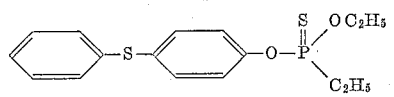

50.5 grams of 4-hydroxy-diphenyl sulfide are dissolved in 300 cc. of methyl ethyl ketone. A mixture of 38 grams of anhydrous potassium carbonate and 1 gram of copper power are added to this solution, the mixture is thereafter warmed to 70° C. for half an hour, treated dropwise with 46 grams of ethylthionophosphonic acid-O-ethyl ester chloride, and then heated under reflux for another 2 hours. After cooling the reaction mixture down to room temperature, the separated precipitate is filtered off with suction, the filtrate poured into water, and worked up as described in Example 1. The product boils at 172° C. under a pressure of 0.01 mm. Hg. The yield amounts to 45 grams (corresponding to 53% of the theoretical).

*Analysis.*—Calculated for $C_{16}H_{19}O_2PS_2$: P, 9.16%; S, 18.95%. Found: P, 9.81%; S, 19.22%.

Mosquito larvae are killed to 80% with 0.00001% solutions and spider mites are killed completely with 0.001% solutions.

Example 8

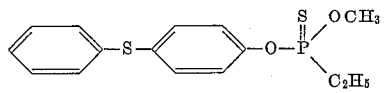

50.5 grams of 4-hydroxy-diphenyl sulfide are dissolved in 300 cc. of methyl ethyl ketone, a mixture of 38 grams of anhydrous potassium carbonate with 1 gram of copper powder is added to this solution, and the mixture warmed to 70° C. for half an hour. 42 grams of ethylthionophosphonic acid-O-methyl ester chloride are then added dropwise to the reaction mixture, which is finally worked up as described in Example 4, after boiling it for 2 hours. Yield: 65 grams (corresponding to 80.5% of the theoretical).

*Analysis.*—Calculated for $C_{15}H_{17}O_2PS_2$: P, 9.55%; S, 19.77%. Found: P, 9.51%; S, 20.12%.

Spider mites and caterpillars are killed completely with 0.01% solutions.

Example 9

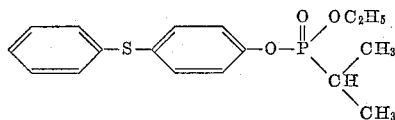

A solution of 50.5 grams of 4-hydroxy-diphenyl sulfide in 300 cc. of methyl ethyl ketone is treated with a mixture of 38 grams of anhydrous potassium carbonate and 1 gram of copper powder, and warmed at 70° C. for half an hour. 44 grams of isopropylphosphonic-acid-O-ethyl ester chloride are then added to the reaction mixture, the latter is heated under reflux for 2 hours, and working up as described in Example 1 is carried out. The product boils at 143° C. under a pressure of 0.001 mm. Hg. The yield amounts to 58 grams (corresponding to 69% of the theoretical).

*Analysis.*—Calculated for $C_{17}H_{21}O_3PS$: P, 9.21%; 9.53%. Found: P, 9.33%; S, 9.78%.

Caterpillars are killed completely with 0.1% solutions.

Example 10

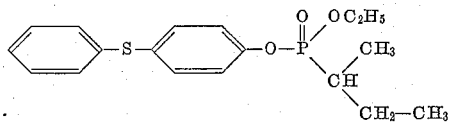

Under conditions of reaction analogous to those of Example 9, there are obtained from 47 grams of isobutylphosphonic acid-O-ethyl ester chloride and 50.5 grams of 4-hydroxy-diphenyl sulfide 56 grams (corresponding to 64% of the theoretical) of the product with the above formula, of B.P. 160° C./0.01 mm. Hg.

*Analysis.*—Calculated for $C_{18}H_{23}O_3PS$: P, 8.84%; S, 9.15%. Found: P, 9.29%; S, 9.23%.

Caterpillars are killed completely with 0.1% solutions.

Example 11

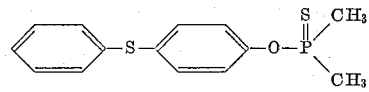

15 grams of anhydrous potassium carbonate and 1 gram of copper powder are added to a solution of 30 grams of 4-hydroxy-diphenyl sulfide in 400 cc. of methyl ethyl ketone, the mixture is heated under reflux for half an hour, and subsequently treated with 19 grams of dimethylthionophosphonic acid chloride. Working up of the reaction mixture is carried out according to the directions of Example 4. The yield amounts to 32 grams (corresponding to 73% of the theoretical).

*Analysis.*—Calculated for $C_{14}H_{15}OPS_2$: P, 10.53%; S, 21.78%. Found: P, 7.49%; S, 19.89%.

Spider mites are killed completely with 0.01% solutions.

Example 12

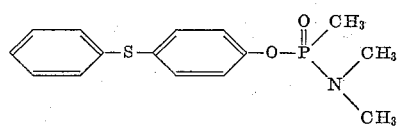

26.5 grams of 4-hydroxy-diphenyl sulfide are dissolved in 400 cc. of methyl ethyl ketone, this solution is treated with 13 grams of anhydrous potassium carbonate and 1 gram of copper powder, thereafter heated under reflux for half an hour, and subsequently 18.5 grams of N,N-dimethylamidomethylphosphonic acid chloride are added dropwise to the reaction mixture, which is finally worked up as described in Example 4. Yield: 28 grams (corresponding to 69.5% of the theoretical).

*Analysis.*—Calculated for $C_{15}H_{18}O_2NPS$: N, 4.56%; P, 10.08%; S, 10.43%. Found: N, 3.78%; P, 8.74%; S, 11.21%.

Spider mites are killed completely with 0.1% solutions.

Example 13

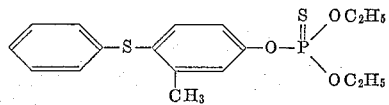

21.6 grams of 2-methyl-4-hydroxy-diphenyl sulfide are dissolved in 400 cc. of methyl ethyl ketone. A mixture of 14 grams of anhydrous potassium carbonate and 1 gram of copper powder is added to the resultant solution, which is then heated under reflux for half an hour, and subsequently treated dropwise with 20 grams of O,O-diethylthionophosphoric acid chloride. Working up of the mixture is carried out as described in Example 4. The yield amounts to 35 grams (corresponding to 95% of the theoretical).

*Analysis.*—Calculated for $C_{17}H_{21}O_3PS_2$: P, 8.41%; S, 17.40%. Found: P, 8.01%; S, 17.86%.

Flies and caterpillars are killed completely with 0.01% solutions.

Example 14

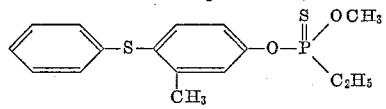

A solution of 21.6 grams of 2-methyl-4-hydroxy-diphenyl sulfide in 400 cc. of methyl ethyl ketone is treated with a mixture of 14 grams of anhydrous potassium carbonate and 1 gram of copper powder, and thereafter boiled under reflux for half an hour. 17 grams of ethylthionophosphonic acid-O-methyl ester chloride are subsequently added dropwise to the reaction mixture, which is then worked up as described in Example 4. Yield: 29 grams (corresponding to 85.5% of the theoretical).

*Analysis.*—Calculated for $C_{16}H_{19}O_2PS_2$: P, 9.16%; S, 18.95%. Found: P, 8.97%; S, 19.07%.

Flies are killed completely with 0.01% solutions and spider mites are killed completely with 0.1% solutions.

Example 15

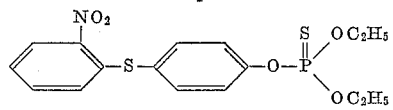

52 grams of 2'-nitro-4-hydroxy-diphenyl sulfide are dissolved in 300 cc. of methyl ethyl ketone, a mixture of 25 grams of anhydrous potassium carbonate and 1 gram of copper powder are added to this solution, and the mixture is subsequently heated under reflux for half an hour. 40 grams of O,O-diethylthionophosphoric acid chloride are thereafter added dropwise to the reaction mixture, which is subsequently heated under a reflux condenser for another 2 hours, and worked up as described in Example 4. There is obtained a yellow oil, which solidifies as crystals after some time and melts at 46° C. Yield: 69 grams (corresponding to 82% of the theoretical).

*Analysis.*—Calculated for $C_{16}H_{18}O_5NPS_2$: N, 3.51%; P, 7.76%; S, 16.05%. Found: N, 3.39%; P, 8.07%; S, 16.26%.

Systemic action with aphids on oats shows 100% killing with 0.1% solutions. Caterpillars are killed completely with 0.01% solutions.

Example 16

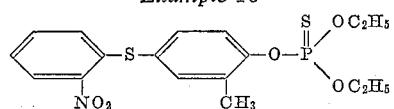

A solution of 39 grams of 2'-nitro-3-methyl-4-hydroxy diphenyl sulfide in 500 cc. of methyl ethyl ketone is treated with a mixture of 21 grams of anhydrous potassium carbonate and 1 gram of copper powder, the whole heated under reflux for another half hour, and thereafter 30 grams of O,O-diethylthionophosphoric acid chloride are added dropwise to the reaction mixture. In order to complete the reaction, the reactants are heated under reflux for 2 hours. It is then processed further as described in Example 4, and there are obtained 54 grams of a brown oil (corresponding to 87.5% of the theoretical yield).

*Analysis.*—Calculated for $C_{17}H_{20}O_5NPS_2$: N, 3.39%; P, 7.49%; S, 15.51%. Found: N, 3.17%; P, 7.59%; S, 15.82%.

Example 17

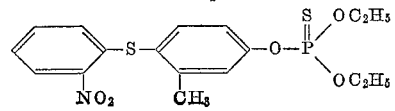

26 grams of 2'-nitro-2-methyl-4-hydroxy-diphenyl sulfide are dissolved in 400 cc. of methyl ethyl ketone. A mixture of 14 grams of anhydrous potassium carbonate and 1 gram of copper powder is added to this solution which is heated under reflux for half an hour; 20 grams of O,O-diethylthionophosphoric acid chloride are then added dropwise to the reaction mixture, which is boiled under a reflux condenser for another 2 hours, and subsequently worked up as described in Example 4. Yield: 37 grams (corresponding to 71% of the theoretical).

*Analysis.*—Calculated for $C_{17}H_{20}O_5NPS_2$: N, 3.39%; P, 7.49%; S, 15.51%. Found: N, 3.38%; P, 7.73%; S, 15.41%.

Flies and caterpillars are killed completely with 0.01% solutions.

Example 18

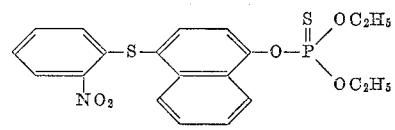

A mixture of 14 grams of anhydrous potassium carbonate and 1 gram of copper powder are added to a solution of 25 grams of 2'-nitro-(2.3)-benzo-4-hydroxy-diphenyl sulfide in 400 cc. of methyl ethyl ketone, the reaction mixture is heated under reflux for half an hour, then treated dropwise with 18 grams of O,O-diethyl-thionophosphoric acid chloride, and the reactants boiled under reflux for 2 hours. After working up by the method described in Example 4, there is obtained a substance which solidifies to lemon-yellow crystals of melting point 102° C. after standing for some time. The yield amounts to 27 grams (corresponding to 71.5% of the theoretical).

*Analysis.*—Calculated for $C_{20}H_{20}O_5NPS_2$: N, 3.12%; P, 6.89%; S, 14.27%. Found: N, 2.91%; P, 7.06%; S, 14.17%.

Flies are killed completely with 0.01% solutions and caterpillars are killed completely with 0.1% solutions.

Example 19

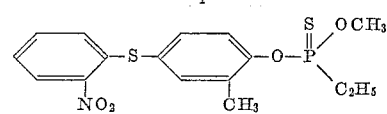

39 grams of 2'-nitro-3-methyl-4-hydroxy-diphenyl sulfide are dissolved in 500 cc. of methyl ethyl ketone, this solution is treated with a mixture of 21 grams of anhydrous potassium carbonate and 1 gram of copper powder, and the mixture is subsequently heated under reflux for half an hour. Thereafter, 26 grams of ethylthionophosphoric acid-O-methyl ester chloride are added dropwise to the reaction which is thereafter boiled under reflux for another 2 hours. It is then processed further as described in Example 4, and there are obtained 51 grams of an oily product (corresponding to 89% of the theoretical).

*Analysis.*—Calculated for $C_{16}H_{18}O_4NPS_2$: N, 3.65%; P, 8.08%; S, 16.72%. Found: N, 3.43%; P, 8.50%; S, 17.31%.

Spider mites and caterpillars are killed completely with 0.1% solutions.

Example 20

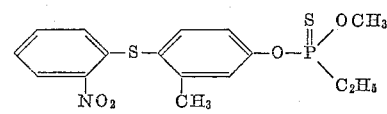

A mixture of 14 grams of anhydrous potassium carbonate and 1 gram of copper powder is added to a solution of 26 grams of 2'-nitro-2-methyl-4-hydroxy-diphenyl sulfide in 400 cc. of methyl ethyl ketone, and the mixture is then heated under reflux for half an hour. It is then treated dropwise with 17 grams of ethylthionophosphonic acid-O-methyl ester chloride, the reactants are boiled under a reflux condenser for another 2 hours, and worked up as described in Example 4. There are obtained 32 grams of an oil (corresponding to 76% of the theoretical).

*Analysis.*—Calculated for $C_{16}H_{18}O_4NPS_2$: N, 3.65%; P, 8.08%; S, 16.72%. Found: N, 3.56%; P, 8.03%; S, 16.81%.

Caterpillars are killed to 80% with 0.001% solutions and spider mites are killed completely with 0.1% solutions.

*Example 21*

A compound of the above formula is obtained by a method analogous to that in Example 10 from 19 grams of isopropylphosphonic acid-O-ethyl ester chloride and 26 grams of 2'-nitro-2-methyl-4-hydroxy-diphenyl sulfide. The yield amounts to 30 grams (corresponding to 69% of the theoretical).

*Analysis.*—Calculated for $C_{18}H_{22}O_5NPS$: S, 8.11%; N, 3.54%; P, 7.83%. Found: S, 7.94%; N, 3.57%; P, 7.69%.

Caterpillars are killed completely with 0.1% solutions.

*Example 22*

27 grams (corresponding to 56% of the theoretical) of the ester with the above constitution are obtained by the reaction of 26 grams of 2'-nitro-2-methyl-4-hydroxy-diphenyl sulfide and 16 grams of N,N-dimethylamido-methylphosphonic acid chloride under conditions of reaction analogous to those described in Example 20.

*Analysis.*—Calculated for $C_{16}H_{19}O_4N_2PS$: N, 7.65%; P, 8.46%; S, 8.75%. Found: N, 7.34%; P, 7.88%; S, 9.28%.

Caterpillars are killed completely with 0.1% solutions.

*Example 23*

25 grams of 2'-nitro-(2.3)-benzo-4-hydroxy-diphenyl-sulfide are dissolved in 400 cc. of methyl ethyl ketone. A mixture of 14 grams of anhydrous potassium carbonate and 1 gram of copper powder is added to the resultant solution, the reaction mixture is heated under reflux for half an hour, treated with 14 grams of N,N-dimethyl-amidomethyl-phosphonic acid chloride, and the reactants are boiled under reflux for 2 hours. Working up is carried out as described in Example 4. There is obtained an oil, which after standing for some time solidifies to yellow crystals of melting point 144° C.; yield 28 grams (corresponding to 82.5% of the theortical).

*Analysis.*—Calculated for $C_{19}H_{19}O_4N_2PS$: N, 6.96%; P, 7.70%; S, 7.97%. Found: N, 6.60%; P, 7.14%, P, 7.05%; S, 7.96%.

Caterpillars are killed completely with 0.1% solutions.

*Example 24*

13 grams of anhydrous potassium carbonate and 1 gram of copper powder are added to a solution of 26 grams of 4'-nitro-4-hydroxy-diphenyl sulfide in 300 cc. of methyl ethyl ketone, and the mixture is heated under reflux for half an hour; 20 grams of O,O-diethyl-thionophosphoric acid chloride are then added dropwise to the reaction mixture, which is boiled under reflux for another 2 hours and worked up as described in Example 4. The yield amounts to 28 grams (corresponding to 66.5% of the theoretical).

*Analysis.*—Calculated for $C_{16}H_{18}O_5NPS_2$: N, 3.51%; P, 7.76%; S, 16.05%. Found: N, 3.45%; P, 7.41%; S, 16.35%.

Spider mites are killed completely with 0.1% solutions and caterpillars with 0.01% solutions.

*Example 25*

19 grams of 4'-nitro-3-methyl-4-hydroxy-diphenyl sulfide are dissolved in 300 cc. of methyl ethyl ketone and 14 grams of anhydrous potassium carbonate and 1 gram of copper powder are added to this solution and subsequently warmed to 70° C. for half an hour. The reaction mixture is then treated dropwise with 16 grams of O,O-diethylthionophosphoric acid chloride, boiled under reflux for 2 hours, and worked up as described in Example 4. Yield: 18 grams (corresponding to 54.5% of the theoretical).

*Analysis.*—Calculated for $C_{17}H_{20}O_5NPS_2$: N, 3.39%; P, 7.49%; S, 15.51%. Found: N, 3.24%; P, 7.29%; S, 16.15%.

Flies are killed completely with 0.01% solutions and caterpillars with 0.1% solutions.

*Example 26*

A solution of 21 grams of 4'-nitro-2-methyl-4-hydroxy-diphenyl sulfide in 300 cc. of methyl ethyl ketone is treated with a mixture of 14 grams of anhydrous potassium carbonate and 1 gram of copper powder, heated under reflux for half an hour, and 17 grams of O,O-diethylthionophosphoric acid chloride are then added dropwise to the reaction mixture, which is boiled under reflux for another 2 hours. Working up of the reactants is carried out as described in Example 4. Yield: 26 grams (corresponding to 71% of the theoretical).

*Analysis.*—Calculated for $C_{17}H_{20}O_5NPS_2$: N, 3.39%; P, 7.49%; S, 15.51%. Found: N, 3.28%; P, 7.21%; S, 15.78%.

Aphids are killed completely with 0.1% solutions and flies are killed to 100% with 0.01% solutions.

*Example 27*

5 drops of concentrated sulfuric acid are added to 110 cc. of absolute ethanol, and 35.4 grams of O,O-diethyl - O - (2 - phenylmercaptophenyl) - thionophosphoric acid ester (for preparation see Example 3) are dissolved in this mixture. The resultant solution is subsequently treated dropwise with 12 grams of 30% of hydrogen peroxide, and thereafter heated at 60 to 70° C. until no reaction can any longer be detected with potassium iodide-starch paper. After cooling, the mixture is poured into water, the separated oil taken up in benzene, the benzene solution washed until the reaction is neutral, and after drying it is clarified with animal charcoal and kieselguhr. The solvent is then evaporated off, and the remaining residue distilled at a water bath temperature of 100° C. and at a pressure of 1 mm. Hg. The yield amounts to 28 grams (corresponding to 75.5% of the theoretical).

*Analysis.*—Calculated for $C_{16}H_{19}O_4PS_2$: P, 8.36%; S, 17.31%. Found: P, 7.70%; S, 17.16%.

Spider mites are killed completely with 0.1% solutions. The compound shows an ovicidal action against the eggs of the red spider.

*Example 28*

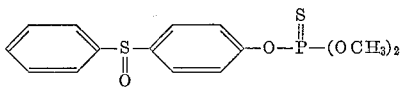

A solution of 33 grams (0.15 mole) of 4-hydroxy-diphenyl sulfoxide (M.P. 144 to 146° C.) in 180 cc. of methyl ethyl ketone is treated with 22 grams (0.16 mole) of potassium carbonate and 0.5 grams of copper powder, and then warmed to 60° C. for one hour, with stirring. 25 grams (0.155 mole) of O,O-dimethyl-thionophosphoric acid chloride are subsequently added dropwise at 60 to 70° C. to the reaction mixture, and the latter is heated at an internal temperature of 80° C. for 4 hours. The mixture is then cooled to 40° C., the precipitate is filtered off with suction, rinsed with benzene, and the filtrate poured into ice-water. The benzene layer is separated, washed with dilute sodium bicarbonate solution, and then dried over sodium sulfate. The solvent is finally removed in vacuum and the residue eventually distilled at 2 mm. Hg and a heating bath temperature of 90° C. for a short time. There are obtained 34 grams (66% of the theoretical yield) of a browny red viscous oil.

*Analysis.*—Calculated for $C_{14}H_{15}O_4PS_2$ (mol. weight 342): P, 9.06%; S, 18.72%. Found: P, 8.40%; S, 17.92%.

*Example 29*

22 grams (0.1 mole) of 4-hydroxy-diphenyl sulfoxide, 15 grams (0.11 mole) of potassium carbonate, and 0.5 gram of copper powder are warmed at 60° C. in 130 cc. of methyl ethyl ketone for an hour, with stirring. The mixture is subsequently treated dropwise, at 60 to 70° C., with 20 grams (0.106 mole) of O,O-diethylthionophosphoric acid chloride, and then heated to 80° C. with stirring for another 4 hours. Working up of the reaction mixture is carried out as stated in the preceding example. 28 grams of a brown-red oil (corresponding to 76% of the theoretical) are obtained.

*Analysis.*—Calculated for $C_{16}H_{19}O_4PS_2$ (mol. weight 370): P, 8.38%; S, 17.30%. Found: P, 8.34%; S, 17.39%.

Flies are killed completely with 0.01% solutions. Systematic action with aphids on oats is 100% with 0.1% solutions.

*Example 30*

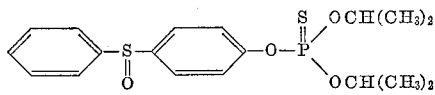

22 grams (0.16 mole) of potassium carbonate and 0.5 gram of copper powder are introduced into 180 cc. of methyl ethyl ketone, and the mixture is warmed to 60° C. with stirring. After an hour 34 grams (0.157 mole) of O,O-diisopropylthionophosphoric acid chloride are slowly added dropwise to the reaction mixture at 60 to 70° C., which is subsequently stirred at 80° C. for 4 hours, and then worked up as described in Example 28, when a viscous oil is obtained. The yield is 38 grams corresponding to 65% of the theoretical.

*Analysis.*—Calculated for $C_{18}H_{23}O_4PS_2$ (mol. weight 398); P, 7.79%; S, 16.1%. Found: P, 7.95%; S, 16.47%.

*Example 31*

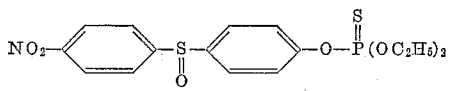

29 grams (0.21 mole) of potassium carbonate and 0.5 gram of copper powder are added, with stirring, to a solution of 53 grams (0.2 mole) of 4-hydroxy-4'-nitro-diphenyl sulfoxide (M.P. 199 to 201° C.) in 250 cc. of methyl ethyl ketone, the mixture is warmed at 60° C. with stirring, for 1 hour, 40 grams (0.21 mole) of O,O-diethyl-thionophosphoric acid chloride are then added dropwise at 60 to 70° C. and the mixture subsequently stirred at 80° C. for another 4 hours. Working up of the reactants is carried out as in Example 28. The reaction product solidifies in the form of crystals, and after recrystallization from a benzene-ligroin mixture exhibits the M.P. 87 to 89° C. Yield: 55 grams corresponding to 66% of the theoretical.

*Analysis.*—Calculated for $C_{16}H_{18}O_6NPS_2$ (mol. weight 415): N, 3.37%; P, 7.47%; S, 15.42%. Found: N, 3.33%; P, 7.35%; S, 15.50%.

Mosquito larvae are killed completely with 0.001% solutions.

*Example 32*

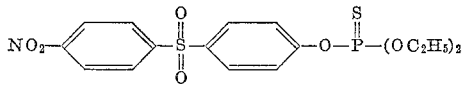

A mixture of 45 grams (0.162 mole) of 4-hydroxy-4'-nitro-diphenyl sulfone (M.P. 169 to 172° C.) and 23 grams (0.166 mole) of potassium carbonate are warmed to 60° C. in 250 cc. of methyl ethyl ketone. After stirring the reaction mixture for one hour, it is treated dropwise at 60 to 70° C. with 32 grams (0.17 mole) of O,O-diethylthionophosphoric acid chloride, subsequently stirred at an internal temperature of 80° C. for another 4 hours, worked up as in Example 28, and there are obtained 57 grams (81% of the theoretical yield) of the product with the above constitution, which melts at 83 to 85° C. after recrystallization from a benzene-ligroin mixture.

*Analysis.*—Calculated for $C_{16}H_{18}O_7NS_2P$ (mol. weight 431): N, 3.25%; S, 14.85%; P, 7.19%. Found N, 3.36%; S, 15.50%; P, 7.38%.

Mosquito larvae are killed to 100% with 0.001% solutions.

*Example 33*

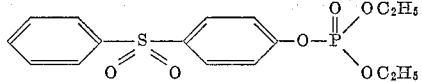

70 grams of 4-hydroxy-diphenyl sulfone are dissolved in 600 cc. of methyl ethyl ketone. A mixture of 42 grams of anhydrous potassium carbonate and 1 g. of copper powder is added to the resultant solution, and subsequently heated under reflux for half an hour. 54 grams of O,O-diethylphosphoric acid chloride are added then dropwise to the reaction mixture, which is boiled under reflux for another 2 hours. Working up of the reactants is carried out as described in Example 4. Yield: 97 grams (corresponding to 87% of the theoretical).

*Analysis.*—Calculated for $C_{16}H_{19}O_6PS$: P, 8.37%; S, 8.66%. Found: P, 8.47%; S, 8.32%.

Spider mites and caterpillars are killed completely with 0.01% solutions.

*Example 34*

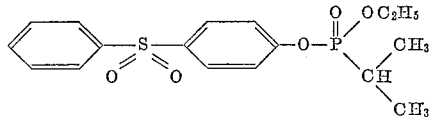

A mixture of 21 grams of anhydrous potassium carbonate and 1 gram of copper powder is added to a solution of 47 grams of 4-hydroxy-diphenyl sulfone in 600 cc. of methyl ethyl ketone, the whole heated under reflux for half an hour, and then treated dropwise with 38 grams of isopropylphosphonic acid-O-ethyl ester chloride. After boiling once more under reflux for 2 hours, the reaction mixture is worked up as described in Example 4. The yield amounts to 62 grams (corresponding to 87.5% of the theoretical).

Analysis.—Calculated for $C_{17}H_{21}C_4PS$: P, 8.79%; S, 9.10%. Found: P, 8.80%; S, 8.35%.

Aphids are killed completely with 0.1% solutions.

*Example 35*

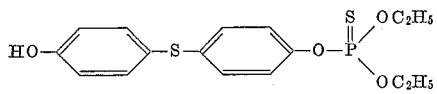

A suspension of 109 grams of 4.4'-dihydroxy-diphenyl sulfide in 1 litre of benzene is treated dropwise with a ½ molar ethanolic solution of sodium ethylate, whilst stirring, then heated under reflux for half an hour, and the ethyl alcohol finally distilled off azeotropically with benzene. The distillation is continued, with addition of more benzene, until no more thanol passes over. The residual benzene is then carefully evaporated, the remaining sodium salt of 4.4'-dihydroxy-diphenyl sulfidol is suspended in methyl ethyl ketone, this suspension boiled under reflux for 2 hours after the addition of 94 grams of O,O-diethylthionophosphoric acid chloride, and worked up as described in Example 4. The yield amounts to 132 grams (corresponding to 71% of the theoretical).

Analysis.—Calculated for $C_{16}H_{19}O_4PS_2$: P, 8.36%; S, 17.31%. Found: P, 8.72%; S, 18.78%.

Caterpillars are killed completely with 0.01% solutions.

*Example 36*

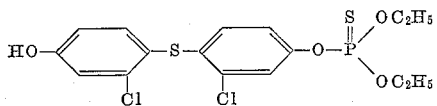

72 grams of 2.2'-dichloro-4.4'-dihydroxy-diphenyl sulfide are suspended in 500 cc. of benzene, and this suspension is treated with as much ethanolic sodium ethylate solution as is required for the formation of the monosodium salt of 2.2'-dichloro-4.4'-dihydroxy-diphenyl sulfide. The mixture is then boiled under reflux for half an hour, the ethanol distilled off azeotropically as described in Example 35, the remaining salt suspended in 600 cc. of methyl ethyl ketone, and the suspension treated dropwise with 48 grams of O,O-diethylthionophosphoric acid chloride. The reaction mixture is subsequently heated under reflux for another 2 hours, and then worked up as described in Example 4. The yield amounts to 88 grams (corresponding to 79% of the theoretical).

Analysis. — Calculated for $C_{16}H_{17}O_4Cl_2PS_2$: Cl, 16.14%; P, 7.05%; S, 14.60%. Found: Cl, 15.36%; P, 7.09%; S, 15.84%.

Caterpillars are killed to 70% with 0.01% solutions.

*Example 37*

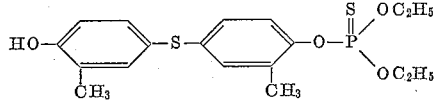

The monosodium salt is prepared from 50 grams of 3.3'-dimethyl-4.4'-dihydroxy-diphenyl sulfide, suspended in 600 cc. of benzene, by the method described in Example 36. 45 grams of O,O-diethylthionophosphoric acid chloride are added dropwise to a suspension of this in 400 cc. of methyl ethyl ketone, the mixture is subsequently boiled under reflux for 2 hours, and worked up as described in Example 4. Yield: 73 grams (corresponding to 90% of the theoretical).

Analysis.—Calculated for $C_{18}H_{23}O_4PS_2$: P, 7.77%; S, 16.09%. Found: P, 8.06%; S, 16.17%.

Caterpillars are killed to 100% with 0.1% solutions.

*Example 38*

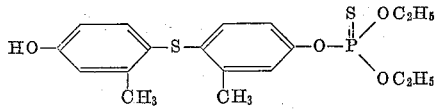

The monosodium salt is prepared from 45 grams of 2.2'-dimethyl-4.4'-dihydroxy-diphenyl sulfide suspended in 600 cc. of benzene as described in Example 36, this is taken up in 600 cc. of methyl ethyl-ketone, and treated dropwise with 35 grams of O,O-diethylthionophosphoric acid chloride. The mixture is then heated under reflux for another 2 hours, and finally worked up as described in Example 4. The yield amounts to 62 grams (corresponding to 85% of the theoretical).

Analysis.—Calculated for $C_{18}H_{23}O_4PS_2$: P, 7.77%; S, 16.09%. Found: P, 7.75%; S, 16.70%, S, 16.78%.

Caterpillars are killed completely with 0.1% solutions.

*Example 39*

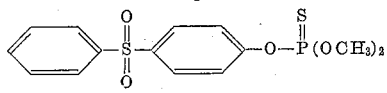

A mixture of 70 grams of 4-hydroxy-diphenyl sulfone (0.3 mole) and 84 grams (0.6 mole) of potassium carbonate is warmed at 60 to 70° C. in 500 cc. of methyl ethyl ketone for half an hour, and subsequently treated dropwise at this temperature with 53 grams (0.33 mole) of O,O-dimethylthionophosphoric acid chloride, whereupon a weakly exothermal reaction ensues. To complete the reaction, the reaction mixture is heated at 70 to 80° C. for another 2 hours, the separated salts filtered off with such after the mixture has cooled down, and the precipitate is rinsed with 250 cc. of benzene. The filtrate is washed, first with water, then with 2 N sodium hydroxide solution, and finally once more with water until the reaction is neutral. After drying the organic phase over sodium sulfate, the solvent is distilled off, whereupon the residue solidifies. The reaction product is obtained in the form of a pale yellow crystalline powder, of M.P. 50° C., by triturating the residue with petroleum ether. The yield amounts of 84 grams (corresponding to 78.5% of the theoretical).

Analysis.—Calculated for $C_{14}H_{15}O_5PS_2$ (mol. weight 358.4): S, 17.89%; P, 8.64%. Found: S, 18.14%; P, 8.58%.

$LD_{50}$ on rats per os amounts to 25 to 50 mg./kg. Caterpillars are killed completely with 0.1% solutions. Systemic action with aphids on oats is 100% with 0.1% solutions.

*Example 40*

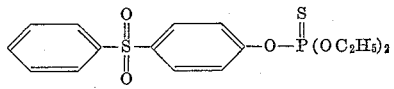

A mixture of 47 grams (0.2 mole) of 2-hydroxy-diphenyl sulfone, 56 grams (0.4 mole) of potassium carbonate, and 500 cc. of methyl ethyl ketone is heated at 60 to 70° C. for half an hour, thereafter 76 grams (0.4 mole) of O,O-diethylthionophosphoric acid chloride are added dropwise at this temperature to the reaction mixture, and this is subsequently warmed at 60 to 70° C. for 2 hours. After the mixture has been cooled down, the separated salts are filtered off with suction, and rinsed with benzene. The filtrate is washed, first with water, then several times with 2 N sodium hydroxide solution, and finally once more with water until the reaction is neutral, dried over sodium sulfate, and the solvent is distilled off. The ester with the above formula remains as a viscouse, red-brown oil. Yield: 75 grams (corresponding to 97.5% of the theoretical).

Analysis.—Calculated for $C_{16}H_{19}O_5PS_2$ (mol. weight 386.4): S, 16.59%; P, 8.02%. Found: S, 17.02%; P, 8.07%.

LD$_{50}$ on rats per os amounts to about 25 mg./kg. Spider mites and caterpillars are killed completely with 0.1% solutions.

*Example 41*

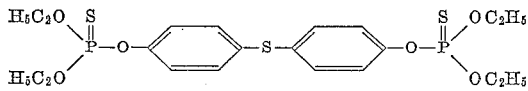

109 grams of 4.4'-dihydroxy-diphenyl sulfide are dissolved in 600 cc. of methyl ethyl ketone. 173 grams of anhydrous potassium carbonate and 1 gram of copper powder are added to the solution obtained and the mixture is subsequently heated under reflux for half an hour. The latter is then treated dropwise with 188 grams of O,O-diethylthionophosphoric acid chloride and thereafter heated to the boil for a further 2 hours. The precipitated salts are then filtered off with suction and the filtrate is poured into water. The separated oil is taken up in benzene, the benzene solution is dried over sodium sulfate and clarified by means of animal charcoal and kieselguhr. The solvent is finally evaporated and the residue distilled under a pressure of 1 mm. Hg at 100° C. The yield amounts to 230 grams (corresponding to 88% of the theoretical).

*Analysis.*—Calculated for $C_{20}H_{28}O_6P_2S_3$: P, 11.86%; S, 18.41%. Found: P, 11.89%; S, 19.91%.

Caterpillars are killed completely with 0.01% solutions. Systemic action with aphids on oats is 100% with 0.1% solutions.

*Example 42*

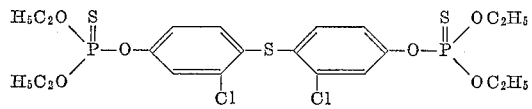

To a solution of 72 grams of 2.2'-dichloro-4.4'-dihydroxy-diphenyl sulfide in 500 cc. of methyl ethyl ketone there is added a mixture of 51 grams of anhydrous potassium carbonate and 1 gram of copper powder, the mixture is heated under reflux for half an hour and then treated dropwise with 97 grams of O,O-diethylthionophosphoric acid chloride. After re-heating to the boil for 2 hours, the reaction mixture is worked up as described in Example 41. Yield: 100 grams (67% of the theoretical).

*Analysis.*—Calculated for $C_{20}H_{26}O_6Cl_2P_2S_3$: Cl, 11.99%; P, 10.48%; S, 16.26%. Found: Cl 12.19%; P, 10.46%; S, 16.50%.

Flies are killed to 100% with 0.01% solutions and caterpillars are killed completely with 0.1% solutions.

*Example 43*

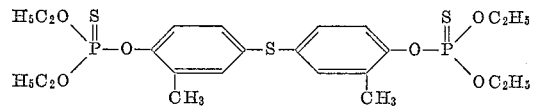

74 grams of 3.3'-dimethyl-4.4'-dihydroxy-diphenyl sulfide are dissolved in 500 cc. of methyl ethyl ketone, a mixture of 73 grams of anhydrous potassium carbonate and 1 gram of copper powder is added to this solution which is heated to reflux for half an hour. After addition of 115 grams of O,O-diethyl-thionophosphoric acid chloride the reaction mixture is boiled under reflux for a further 2 hours and finally worked up as described in Example 41. The yield amounts to 144 grams (corresponding to 87% of the theoretical).

*Analysis.*—Calculated for $C_{22}H_{32}O_6P_2S_3$: P, 11.25%; S, 17.47%. Found: P, 11.01%; S, 17.05%.

Caterpillars are killed completely with 0.1% solutions. Systemic action with aphids on oats is 100% with 0.1% solutions.

*Example 44*

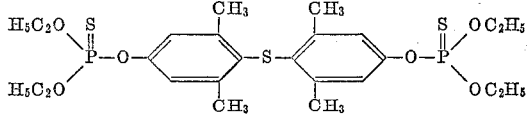

A solution of 55 grams of 2.2'.6.6'-tetramethyl-4.4'-dihydroxy-diphenyl sulfide in 400 cc. of methyl ethyl ketone is treated with a mixture of 42 grams of anhydrous potassium carbonate and 1 gram of copper powder and then heated under reflux for a further half an hour. 80 grams of O,O-diethyl-thionophosphoric acid chloride are subsequently added dropwise to the reaction mixture which is boiled under reflux for 2 hours and worked up as described in Example 41. Yield 108 grams (corresponding to 92% of the theoretical).

*Analysis.*—Calculated for $C_{24}H_{36}O_6P_2S_3$: P, 10.71%; S, 16.62%. Found: P, 10.47%; S, 16.11%.

Flies are killed completely with 0.01% solutions.

*Example 45*

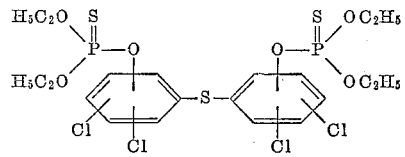

54 grams of a bis-(dichloro-hydroxy-phenyl)-sulfide (M.P. 188° C. prepared according to the dates of prior art) are dissolved in 400 cc. of methyl ethyl ketone. A mixture of 28 grams of anhydrous potassium carbonate and 1 gram of copper powder is added to this solution, the reaction mixture is subsequently heated under reflux for a half an hour, then treated dropwise with 57 grams of O,O-diethyl thionophosphoric acid chloride and boiled under reflux for a further 2 hours. Working up is carried out as described in Example 41. Yield: 78 grams (77% of the theoretical).

*Analysis.*—Calculated for $C_{20}H_{24}O_6Cl_4P_2S_3$: Cl, 21.43%; P, 9.38%; S, 14.56%. Found: Cl, 22.01%; P, 9.23%; S, 14.18%.

Spider mites are killed completely with 0.1% solutions and flies with 0.01% solutions.

*Example 46*

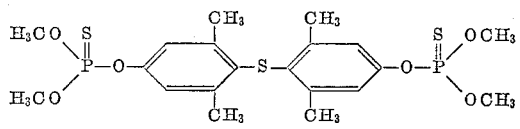

To a solution of 55 grams of 2.2'.6.6'-tetramethyl-4.4'-dihydroxy-diphenyl sulfide in 400 cc. of methyl ethyl ketone there are added 42 grams of anhydrous potassium carbonate and 1 gram of copper powder, the mixture is then heated under reflux for a half an hour, subsequently treated dropwise with 75 grams of O,O-dimethyl-thionophosphoric acid chloride and boiled under reflux for a further 2 hours. Working up of the reaction mixture is effected as described in Example 41. Yield: 78 grams (73.5% of the theoretical).

*Analysis.*—Calculated for $C_{20}H_{28}O_6P_2S_3$: P, 11.86%; S, 18.40%. Found: P, 10.29%; S, 17.54%.

Systemic action with aphids on oats is 100% with 0.1% solutions.

*Example 47*

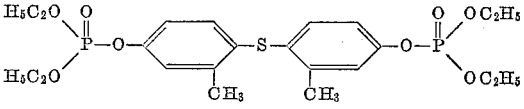

62 grams of 2.2'-dimethyl-4.4'-dihydroxy-diphenyl sulfide are dissolved in 600 cc. of methyl ethyl ketone, the solution is treated with 52 grams of anhydrous potassium carbonate and 1 gram of copper powder, heated under reflux for a half an hour, and 90 grams of O,O-diethyl phosphoric acid chloride are then added to the reaction mixture. After reheating under reflux for 2 hours, the reaction mixture is worked up as described in Example 41. The yield amounts to 112 grams (corresponding to 85.5% of the theoretical).

*Analysis.*—Calculated for $C_{22}H_{32}O_8P_2S$: P, 11.95%; S, 6.18%. Found: P, 11.97%; S, 6.58%.

Example 48

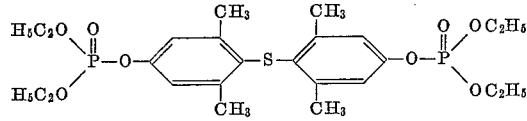

55 grams of 2.2'.6.6'-tetramethyl-4.4'-dihydroxy diphenyl sulfide are dissolved in 400 cc. of methyl ethyl ketone. After addition of 42 grams of anhydrous potassium carbonate and 1 gram of copper powder, the solution obtained is boiled under reflux for half an hour, then treated dropwise with 73 grams of O,O-diethyl phosphoric acid chloride and heated at the boil for a further 2 hours. Finally, the mixture is worked up as described in Example 41. The yield amounts to 90 grams (corresponding to 81.5% of the theoretical).

*Analysis.*—Calculated for $C_{24}H_{36}O_8P_2S$: P, 11.34%; S, 6.18%. Found: P, 11.97%; S, 6.58%.

Example 49

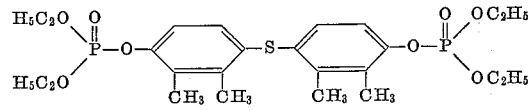

A solution of 56 grams of 2.2'.3.3'-tetramethyl-4.4'-dihydroxy-diphenyl sulfide in 600 cc. of methyl ethyl ketone is boiled under reflux for a half an hour after addition of 44 grams of anhydrous potassium carbonate and 1 gram of copper powder. 72 grams of O,O-diethyl-phosphoric acid chloride are subsequently added dropwise to the reaction mixture, which is heated to the boil for a further 2 hours. It is then worked up as described in Example 41. Yield: 79 grams (71% of the theoretical).

*Analysis.*—Calculated for $C_{24}H_{36}O_8P_2S$: P, 11.34%; S, 5.87%. Found: P, 11.90%; S, 5.57%.

Aphids and spider mites are killed completely with 0.1% solutions.

Example 50

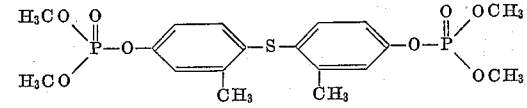

To a solution of 62 grams of 2.2'-dimethyl-4.4'-dihydroxy-diphenyl-sulfide in 600 cc. of methyl ethyl ketone there are added 52 grams of anhydrous potassium carbonate and 1 gram of copper powder, the mixture is heated under reflux for a half an hour, then treated dropwise with 78 grams of O,O-dimethyl phosphoric acid chloride, and heating is continued for a further 2 hours. The mixture is worked up as described in Example 41. The yield amounts to 54 grams (corresponding to 51.5% of the theoretical).

*Analysis.*—Calculated for $C_{18}H_{24}O_8P_2S$: P, 13.40%; S, 6.93%. Found: P, 12.13%; S, 7.67%.

Spider mites are killed completely with 0.1% solutions.

Example 51

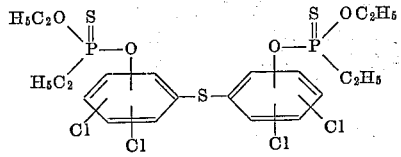

54 grams of a bis-(dichloro-hydroxyphenyl)-sulfide (M.P. 188° C. prepared according to the dates of prior art) are dissolved in 400 cc. of methyl ethyl ketone. A mixture of 28 grams of anhydrous potassium carbonate and 1 gram of copper powder is added to the solution obtained, this is heated under reflux for a half an hour, 52 grams of ethyl-thionophosphonic acid-O-ethyl ester chloride are subsequently added dropwise to the reaction mixture and the latter is boiled under reflux for a further 2 hours. The working up of the mixture is carried out as described in Example 41. Yield: 69 grams (72% of the theoretical).

*Analysis.*—Calculated for $C_{20}H_{24}O_4Cl_4P_2S_3$: Cl, 22.57%; P, 9.86%; S, 15.31. Found: Cl, 24.43%; P, 9.75%; S, 15,69%.

Spider mites and caterpillars are killed completely with 0.1% solutions.

Example 52

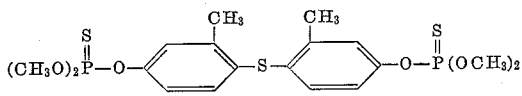

A solution of 44 grams (0.2 mole) of 2.2'-dimethyl-4.4'-dihydroxy-diphenyl sulfide (M.P. 148° C.) in 400 cc. of methyl ethyl ketone is treated with 112 grams (0.8 mole) of potassium carbonate and subsequently heated to 60 to 70° C. for half an hour. After addition of 0.5 gram of copper powder, 64 grams (0.4 mol) of O,O-dimethyl-thionophosphoric acid chloride are added dropwise to the mixture, whereby a slight exothermic reaction takes place, the mixture is stirred at 70 to 80° C. for a further 2 hours and then allowed to cool, the precipitated salts are filtered off with suction and the filter residue is washed with 250 cc. of benzene. The filtrate is washed repeatedly with water, the organic phase is then separated, dried over sodium sulfate and freed of the solvent. The residue is distilled under high vacuum and the ester of the above formula is obtained as a viscous greenish oil. The yield amounts to 75 grams (corresponding to 75.7% of the theoretical).

*Analysis.*—Calculated for $C_{18}H_{24}O_6P_2S_3$ (mol. weight 494.5): S, 19.45%; P, 12.53%. Found: S, 19.62%; P, 12.49%.

Upon oral application of 500 to 1000 mg. of the compound per kg. of rat, the animals used in the test show toxic symptoms but no death occurs. Caterpillars are killed completely with 0.1% solutions and systemic action with aphids on oats is 100% with 0.1 solutions.

Example 53

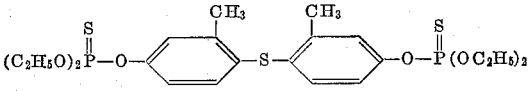

74 grams (0.3 mole) of 2.2'-dimethyl-4.4'-dihydroxy diphenyl sulfide (M.P. 148° C.) and 168 grams (1.2 mole) of potassium carbonate are heated to 60 to 70° C. in 500 cc. of methyl ethyl ketone for half an hour. When the slight exothermic reaction has subsided, 112 grams (0.6 mole) of O,O-diethyl-thionophosphoric acid chloride are added dropwise at the above temperature to the reaction mixture and the latter is heated to 70 to 80° C. for a further 2 hours. After cooling of the mixture, the solid component is filtered off with suction and washed with 300 cc. of benzene. The filtrate is washed with cold water, the benzene solution dried over sodium sulfate and the solvent is distilled off. There remain 140 grams (85% of the theoretical) of the ester of the above constitution in the form of a brown viscous oil, which is not distillable.

*Analysis.*—Calculated for $C_{22}H_{32}O_6P_2S_3$ (mol. weight 550.6): S, 17.47%; P, 11.00%. Found: S, 17.44%; P, 10.82%.

Upon oral application of 100 mg. per kg. of animal rats show only symptoms, no death occurs. Mosquito larvae are killed completely with 0.1% solutions.

*Example 54*

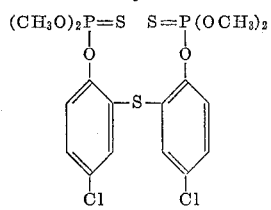

A mixture of 57 grams (0.2 mol) of 2.2′-dihydroxy-5.5′-dichloro-diphenyl sulfide (M.P. 171° C.) and 112 grams (0.8 mole) of potassium carbonate is heated 60 to 70° C. in 400 cc. of methyl ethyl ketone for half an hour to 64 grams (0.4 mole) of O,O-dimethyl-thionophosphoric acid chloride are subsequently added dropwise at the same temperature to the reaction mixture, which is then heated to 70 to 80° C. for a further 2 hours, the precipitated salts are filtered off with suction after cooling and the filter residue is washed with 300 cc. of benzene. The filtrate is washed with water, dried over sodium sulfate and the solvent finally distilled off. There remain as residue 76 grams (71% of the theoretical) of the above ester in the form of an orange colored oil which is not distillable even under high vacuum.

*Analysis.*—Calculated for $C_{16}H_{18}O_6Cl_2P_2S_3$ (mol. weight 535.4): Cl, 13.24%; P, 11.59%; S, 11.31%. Found: Cl, 13.05%; P, 11.79%; S, 11.40%.

$LD_{50}$ on rats per os 500 to 750 mg./kg. Aphids and spider mites are killed completely with 0.1% solutions.

*Example 55*

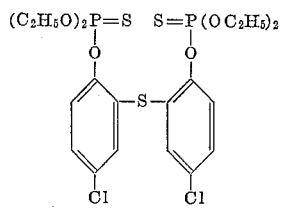

A mixture of 86 grams (0.3 mole) of 2.2′-dihydroxy-5.5′-dichloro-diphenyl sulfide (M.P. 171° C.), 168 grams (1.2 moles) of potassium carbonate and 500 cc. of methyl ethyl ketone is heated to 60 to 70° C. for half an hour (112 grams (0.6 mole) of O,O-diethyl-thionophosphoric acid chloride are then added dropwise at the same temperature to the mixture which is subsequently heated to 70 to 80° for a further 2 hours. After cooling of the reaction mixture, the precipitated salts are filtered off with suction and washed with 300 cc. of benzene. The filtrate is repeatedly washed with water, then dried over sodium sulfate and the solvent distilled off. There remain 132 grams (74% of the theoretical) of the ester of the above formula as a dark-brown viscous oil.

*Analysis.*—Calculated for $C_{20}H_{26}O_6Cl_2P_2S_3$ (mol. weight 391.5): Cl, 11.99%; S, 16.26%; P, 10.47%. Found: Cl, 11.75%; S, 16.12%; P, 10.32%.

On rats per os the compound has a mean toxicity of 500 mg./kg. Mosquito larvae are killed completely with 0.1% solutions.

*Example 56*

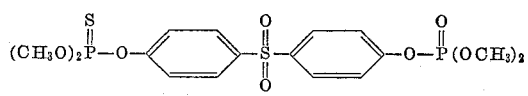

50 grams (0.2 mole) of 4.4′-dihydroxy-diphenyl sulfone and 56 grams (0.4 mole) of potassium carbonate are heated to 60 to 70° C. in 400 cc. of methyl ethyl ketone for half an hour. After dropwise addition of 73 grams (0.4 mole) of O,O-dimethyl-thionophosphoric acid chloride to the reaction mixture, the latter is heated to 70 to 80° C. for 2 hours, after cooling the precipitated salts are filtered off with suction and washed with benzene. The filtrate is washed with water and a 2 N sodium hydroxide solution, subsequently dried over sodium sulfate and the solvent is distilled off. A pale yellow, viscous oil is obtained as residue. The yield amounts to 65 grams (corresponding to 65.3% of the theoretical).

*Analysis.*—Calculated for $C_{16}H_{20}O_8P_2S_3$ (mol. weight 498.5): S, 19.29%; P, 12.43%. Found: S, 19.03%; P, 12.08%.

On rats per os $LD_{50}$ amounts to 250 mg./kg. Caterpillars are killed completely with 0.1% solutions. Systemic action with aphids on oats is 100% with 0.1% solutions.

*Example 57*

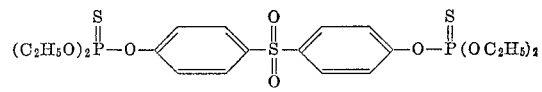

A mixture of 50 grams (0.2 mole) of 4.4′-dihydroxy-diphenyl sulfone and 56 grams (0.4 mole) of potassium carbonate is heated to 60 to 70° C. in 500 cc. of methyl ethyl ketone for half an hour. 76 grams (0.4 mole) of O,O-diethylthionophosphoric acid chloride are then added dropwise at the same temperature to the reaction mixture, which is then heated to 70 to 80° C. for a further 2 hours and finally worked up as described in the preceding example. The ester of the above formula is obtained as residue in the form of a pale yellow, viscous oil. Yields: 80 grams (72% of the theoretical).

*Analysis.*—Calculated for $C_{20}H_{28}O_8P_2S_3$ (mol. weight 554.6): S, 17.34%; P, 11.17%. Found: S,17.60%; P, 11.19%.

$LD_{50}$ toxicity on rats per os 25 mg./kg. Caterpillars are killed completely with 0.1% solutions.

*Example 58*

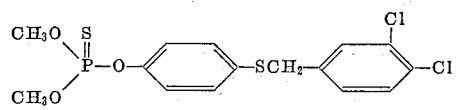

A mixture of 400 grams (1.4 moles) of 4-(3′.4′-dichlorobenzyl)-mercaptophenyl, 1.3 litres of methyl ethyl ketone and 210 grams of potassium carbonate is stirred for 30 minutes at 65° C., subsequently treated dropwise at the same temperature with 311 grams of a 72.5% solution of O,O-dimethylthionophosphoric acid chloride in xylene and after completion of the addition stirred for another 2 hours at 65 to 70° C. The reaction mixture is allowed to cool down, 1.2 litres of benzene and one litre of water are then added and the mixture is vigorously stirred. The organic phase is subsequently separated, washed with water until neutral, dried and freed of the solvent under vacuum. 558 grams (97% of the theoretical) of a slightly yellowish water-insoluble oil remain as residue.

*Analysis.*—Calculated for a mol. weight of 409.28: P, 7.57%; S, 15.67%; Cl, 17.33%. Found: P, 7.58%; S. 15.80%; Cl, 17.28%.

Caterpillars are killed to 60%, aphids and beetles even to 90% with 0.004% solutions.

*Example 59*

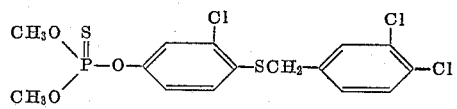

A solution of 48 grams (0.15 mole) of 3-chloro-4-(3′.4′-dichlorobenzyl)-mercapto phenol in 200 cc. of toluene is stirred, together with 30 grams of potassium carbonate and 0.2 gram of powdered copper, for 30 minutes at 65° C. Subsequently, 33.4 grams of a 72.5% solution of O,O-dimethylthionophosphoric acid chloride in xylene are added dropwise to the reaction mixture whilst stirring, at 70° C., and the latter is stirred for a further 3 hours at 75 to 80° C. The mixture is then filtered, stirred with 200 cc. of water, the organic phase is washed until neutral, dried and freed of the solvent under vacuum. 57.8 grams (86% of the theoretical) of a brown, thick, water-insoluble oil remain as residue.

*Analysis.*—Calculated for mol. weight 443.73: P, 6.98%; S, 14.45%; Cl, 23.97%. Found: P, 6.86%; S, 14.68%; Cl, 23.84%.

Caterpillars are destroyed to 90% even by 0.001% solutions.

*Example 60*

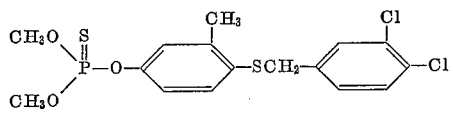

59.8 grams (0.2 mole) of 3-methyl-4-(3'.4'-dichlorobenzyl)-mercapto phenol are dissolved in a mixture of 200 cc. of toluene and 60 cc. of methyl ethyl ketone, this solution is stirred, after addition of 30 grams of potassium carbonate and 0.3 gram of powdered copper, for 30 minutes at 65° C., 44.5 grams of a 72.5% solution of O,O-dimethylthionophosphoric acid chloride in xylene are then added dropwise to the reaction mixture at 70° C. and the latter is stirred for 4 hours at 75 to 80° C. After the mixture has cooled down, 200 cc. of water are introduced into it with stirring. The organic phase is then separated, washed with water until neutral, dried and the solvent is evaporated under vacuum. 66.0 grams (78% of the theoretical) of a thick brown water-insoluble oil remain as residue.

*Analysis.*—Calculated for a mol. weight of 423.31: P, 7.32%; Cl, 16.75%. Found: P, 6.11%; Cl, 16.55%.

Fly larvae are killed to 50% by 0.01% solutions of the compounds.

*Example 61*

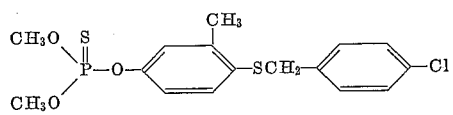

A mixture of 53.0 grams (0.2 mole) of 3-methyl-4-(4'-chlorobenzyl)-mercapto phenol, 200 cc. of toluene, 60 grams of methyl ethyl ketone, 30 grams of potassium carbonate and 0.3 gram of powdered copper is stirred for 30 minutes at 65° C. 44.5 grams of a 72.5% solution of O,O-dimethyl-thionophosphoric acid chloride in xylene are then added dropwise at 70° C. to the mixture and the latter is stirred for a further 4 hours at 75° to 80° C. After working up the reaction mixture in the manner described in the preceding Examples, 44.5 grams (57% of the theoretical) of a thick brown water-insoluble oil are obtained.

*Analysis.*—Calculated for mol. weight 388.86: P, 7.97%. Found: P, 7.54%.

Spider mites are killed completely with 0.1% solutions.

*Example 62*

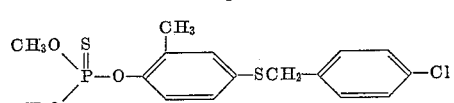

A mixture of 53.0 grams (0.2 mole) of 2-methyl-4-(4'-chlorobenzyl)-mercapto phenol, 200 cc. of toluene, 60 cc. of methyl ethyl ketone, 30 grams of potassium carbonate and 0.3 gram of powdered copper is heated for 30 minutes whilst stirring at 65° C., 44.5 grams of 72.5% solution of O,O-di-methylthionophosphoric acid chloride in xylene are subsequently added dropwise to the well stirred mixture at 70° C. and the latter is heated, in order to complete the reaction, under continued stirring, for 4 hours at 75 to 80° C. After working up the reaction mixture as described in the Examples 58 to 60, 62.0 grams (80% of the theoretical) of a thick brown water-insoluble oil are obtained.

*Analysis.*—Calculated for mol. weight 388.86: P, 7.97%; S, 16.49%. Found: P, 6.25%; S, 15.40%.

Flies are killed completely with 0.01% solutions.

*Example 63*

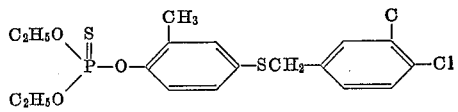

A mixture of 59.8 grams (0.2 mole) of 2-methyl-4-(3'.4'-dichlorobenzyl)-mercapto phenol, 200 cc. of toluene, 60 cc. of methyl ethyl ketone, 30 grams of potassium carbonate and 0.3 gram of powdered copper is stirred for 30 minutes at 65° C. 37.6 grams of O,O-diethylthionophosphoric acid chloride are then added dropwise to the reaction mixture at 70° C. whilst stirring and the latter is worked up, after further stirring for 3 hours at 70 to 80° C. as described in the Examples 58 to 60. 66.1 grams (73% of the theoretical) of a viscous brown water-insoluble oil are obtained.

*Analysis.*—Calculated for mol. weight 451.36: P, 6.86%; S, 14.21%. Found: P, 5.78%; S, 13.46%.

Flies are killed completely with 0.01% solutions.

*Example 64*

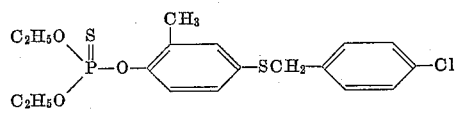

52.9 grams (0.2 mole) of 2-methyl-4-(4'-chlorobenzyl)-mercapto phenol are dissolved in a mixture of 200 cc. of toluene and 60 cc. of methyl ethyl ketone, this solution is heated, together with 30 grams of potassium carbonate and 0.3 gram of powdered copper with stirring for 30 minutes to 65° C. and subsequently treated dropwise at 70° C. with 38 grams of O,O-diethylthionophosphoric acid chloride. After further stirring for 3 hours at 75 to 80° C. the reaction mixture is worked up as described in Examples 58 to 60. 56.0 grams (67% of the theoretical) of a brown water-insoluble oil are obtained.

*Analysis.*—Calculated for a mol. weight of 416.92; P, 7.43%; S, 15.38%. Found: P, 6.42%; S, 14.77%.

*Example 65*

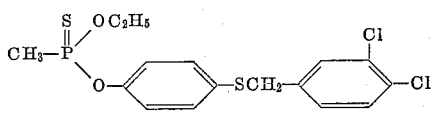

A solution of 43.0 grams (0.15 mole) of 4-(3'.4'-dichlorobenzyl)-mercapto phenol in 150 cc. of methyl ethyl ketone together with 25 grams of potassium carbonate, is stirred for 30 minutes at 65° C. Subsequently, 23.8 grams of methyl-thionophosphoric acid-O-ethyl ester chloride are added dropwise to the reaction mixture, the latter is stirred for another 2 hours at 75° C. and then treated with 150 cc. of benzene and 150 cc. of water. The organic phase is then washed with water until neutral, dried and freed of the solvent under vacuum. 54.5 grams (89% of the theoretical) of a yellowish water-insoluble oil remain as residue.

*Analysis.*—Calculated for a mol. weight of 407.31: P, 7.61%; S, 15.74%; Cl, 17.41%. Found: P, 7.67%; S, 15.87%; Cl, 17.40%.

Spider mites are killed completely with 0.01% solutions and caterpillars are killed completely with 0.1% solutions.

*Example 66*

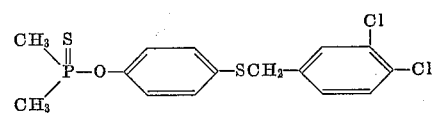

A mixture of 43.0 grams (0.15 mole) of 4-(3'.4'-dichlorobenzyl)-mercapto phenol, 150 cc. of methyl ethyl ketone and 25 grams of potassium carbonate is stirred for 30 minutes at 65° C. subsequently treated dropwise with 19.3 grams of dimethylthionophosphinic acid chloride and heated with continued stirring for 2 hours to 75° C. For working up 250 cc. of benzene and 150 cc. of water are added to the reaction mixture, the organic phase is washed with water until neutral and dried. On addition of petroleum ether the product of the above composition crystallizes in the form of colorless crystals of M.P. 110° C. The yield is 30 grams (53% of the theoretical).

*Analysis.*—Calculated for a mol. weight of 377.28: P, 8.31%; S, 17.0%; Cl, 18.80%. Found: P, 8.28%; S, 17.11%; Cl 18.78%.

Spider mites and aphids are killed completely with 0.1% solutions.

We claim:

1. A compound of the formula

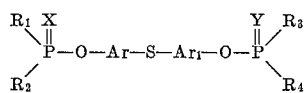

wherein $R_1$, $R_2$, $R_3$ and $R_4$ are each lower alkoxy having up to 4 carbon atoms, X and Y are each a chalcogen having an atomic number from 8 to 16 and Ar and $Ar_1$ are phenylene, a chloro phenylene radical and a lower alkyl phenylene radical.

2. A compound of the formula

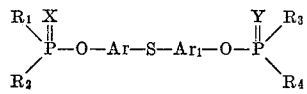

wherein $R_1$, $R_2$, $R_3$ and $R_4$ are each lower alkoxy having up to 4 carbon atoms, X and Y are each a chalcogen having an atomic number from 8 to 16 and Ar and $Ar_1$ are chlorophenylene.

3. A compound of the formula

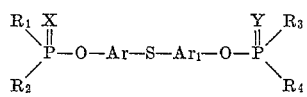

wherein $R_1$, $R_2$, $R_3$ and $R_4$ are each lower alkoxy having up to 4 carbon atoms, X and Y are each a chalcogen having an atomic number from 8 to 16 and Ar and $Ar_1$ are each lower alkyl phenylene.

4. The compound of the following formula

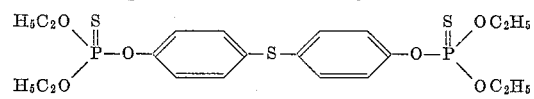

5. The compound of the following formula

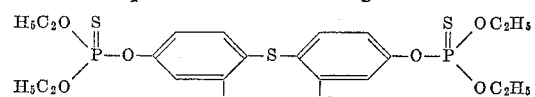

6. The compound of the following formula

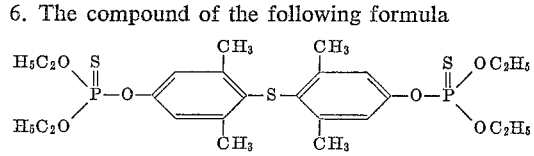

References Cited in the file of this patent
UNITED STATES PATENTS

| | | |
|---|---|---|
| 2,803,580 | Metivier | Aug. 20, 1957 |
| 2,916,509 | Schegk et al. | Dec. 8, 1959 |

FOREIGN PATENTS

| | | |
|---|---|---|
| 560,179 | Belgium | Sept. 14, 1957 |
| 1,078,124 | Germany | Mar. 24, 1960 |
| 1,089,376 | Germany | Sept. 22, 1960 |
| 812,530 | Great Britain | Apr. 29, 1959 |

OTHER REFERENCES

Fukuto et al.: "J. Agr. Food Chem.," vol. 4, pp. 930–935 (1956), 260–461.312.

UNITED STATES PATENT OFFICE
CERTIFICATE OF CORRECTION

Patent No. 3,153,663                         October 20, 1964

Wilhelm Sirrenberg et al.

It is hereby certified that error appears in the above numbered patent requiring correction and that the said Letters Patent should read as corrected below.

Column 19, lines 64 to 67, the formula should appear as shown below instead of as in the patent:

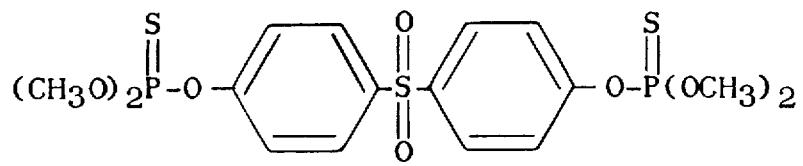

column 22, lines 8 to 12, the formula should appear as shown below instead of as in the patent:

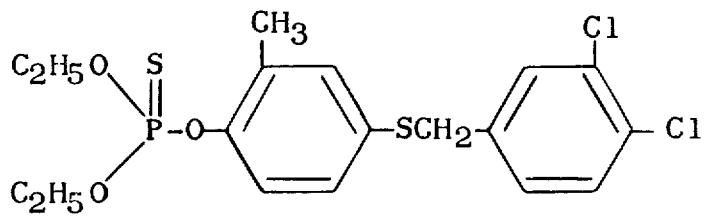

Signed and sealed this 23rd day of March 1965.

(SEAL)
Attest:

ERNEST W. SWIDER                               EDWARD J. BRENNER
Attesting Officer                              Commissioner of Patents